United States Patent
Wang et al.

(10) Patent No.: US 8,650,309 B2
(45) Date of Patent: Feb. 11, 2014

(54) CASCADING ARCHITECTURE FOR AUDIO AND VIDEO STREAMS

(75) Inventors: Henry Wang, Zhejiang (CN); Andrew Shen, Zhejiang (CN); Lamfung Wen, Zhejiang (CN); Wallice Wang, Zhejiang (CN)

(73) Assignee: Cisco Technology, Inc., San Jose, CA (US)

( * ) Notice: Subject to any disclaimer, the term of this patent is extended or adjusted under 35 U.S.C. 154(b) by 32 days.

(21) Appl. No.: 13/486,116

(22) Filed: Jun. 1, 2012

(65) Prior Publication Data

US 2013/0326070 A1  Dec. 5, 2013

(51) Int. Cl.
*G06F 15/16* (2006.01)
(52) U.S. Cl.
USPC .......................................... 709/227; 709/204
(58) Field of Classification Search
USPC ................................ 709/200–205, 217–227
See application file for complete search history.

(56) References Cited

U.S. PATENT DOCUMENTS

| 7,084,898 | B1 |   | 8/2006  | Firestone et al. |
| 7,492,730 | B2 | * | 2/2009  | Eshel et al. ..................... 370/260 |
| 7,800,642 | B2 | * | 9/2010  | Eshkoli et al. ............. 348/14.08 |
| 7,990,899 | B2 | * | 8/2011  | Anson et al. ................... 370/260 |
| 8,446,451 | B2 | * | 5/2013  | Eshkoli et al. ............. 348/14.01 |
| 2008/0043645 | A1 | * | 2/2008  | Anson et al. ................... 370/266 |
| 2008/0288580 | A1 | * | 11/2008 | Wang et al. ................... 709/203 |
| 2010/0223320 | A1 | * | 9/2010  | Huang et al. .................. 709/203 |
| 2010/0228824 | A1 | * | 9/2010  | Lin et al. ....................... 709/204 |
| 2011/0069642 | A1 | * | 3/2011  | Karam et al. ................. 370/260 |
| 2013/0235147 | A1 | * | 9/2013  | Eshkoli et al. ............. 348/14.09 |

\* cited by examiner

*Primary Examiner* — Moustafa M Meky
(74) *Attorney, Agent, or Firm* — Edell, Shapiro & Finnan, LLC (57) ABSTRACT

An approach to supplying a data stream, for e.g., an internet-based video conference, to multiple client devices in a network, including attempting, at a first client device, to join an Internet Protocol (IP) multicast session in a network in which the first client device is operating and, if unsuccessful to attempt to join a unicast transmission of the data stream from a network node other than the meeting server and that is in a same subnet as the first client device, and if the unicast join within the same subnet is unsuccessful, registering the first client device with the meeting server to obtain at least one candidate node from which to receive the data stream.

20 Claims, 6 Drawing Sheets

CASCADING ARCHITECTURE FOR AUDIO AND VIDEO STREAMS

TECHNICAL FIELD

The present disclosure relates to web based meetings in which a media server provides audio and/or video data streams to multiple clients within or outside of an enterprise setting.

BACKGROUND

When hosting a large web conference meeting or other online communication session with many participants, particularly meetings involving video content, the data streams can utilize significant bandwidth for an enterprise such as a corporation or organization. Certain techniques are known for reducing bandwidth usage for transmission of data streams to multiple end points, nodes or client devices, including, e.g., Internet Protocol (IP) multicasting. However, this particular technique can present certain challenges.

For example, in many instances, IP multicast over the Internet is blocked by an enterprise for security reasons. IP multicast also often requires specific management attention on the part of a network administrator to enable multicasting and preserve selected multicast ports. Accordingly, IP multicast can be labor intensive with respect to managing the network and, in any event, might not even be a viable option due to security concerns.

DESCRIPTION OF EXAMPLE EMBODIMENTS

Overview

A method, a system and computer readable storage media provide an approach to supplying a data stream, from e.g., an internet-based video conference meeting server, to multiple client devices in a network. The approach includes attempting, at a first client device, to join an Internet Protocol (IP) multicast session in a network in which the first client device is operating and, if successful receiving a selected data stream that originates from the meeting server, if the IP multicast session join attempt fails in the network in which the first client device is operating, having the first client device attempt to join a unicast transmission of the data stream from a network node other than the meeting server and that is in a same subnet as the first client device, and if the unicast join within the same subnet is unsuccessful, registering the first client device with the meeting server to obtain at least one candidate node in a wide area network from which to receive a transmission of the selected data stream.

Example Embodiments

In an effort to provide improved bandwidth utilization in the context of streaming media, embodiments described herein leverage IP multicasting, unicast transmission (in a given subnet and outside a given subnet) and direct media server connectivity using a cascading technique that is self-organized by the nodes or client devices of the network that desire to receive the media stream or data stream (sometimes also referred to as "meeting data" or "session data").

More specifically, the systems and methodologies described herein employ "cascading" as a framework for meeting attendees to construct a network or topology to distribute meeting data. In this approach, both IP multicast and unicast in a subnet are leveraged, selectively, according to the given network environment of meeting attendees, i.e., individual client devices. Additionally, multiple levels of cascading in a subnet or even in a WAN can be instantiated without substantially impacting latency or media stream delivery delay.

In one embodiment, the cascading framework is configured to detect the network environment of client devices and automatically choose an appropriate strategy to distribute the media stream. This approach can have the effect of increasing the likelihood that both the outbound bandwidth of a host media server and inbound bandwidth of a customer's network, e.g., a local area network (LAN), are reduced without significant degradation of a given user's (e.g., a meeting attendee's) experience. As will be appreciated by those skilled in the art, multiple levels of cascading can be particularly useful, especially for large video sharing events (e.g., world wide web hosted meetings).

At a high level, selected client devices within the network are chosen as "super nodes" (SNs) and are configured to relay a media stream (e.g., audiovisual content of a videoconference meeting) to other client devices, which are called "normal nodes" (NN). Cascading control logic within the respective client devices constructs the SN-NN relationships among the client devices according to their network environments to optimize a topology to distribute the media stream.

For convenience, the following terms are defined and are used throughout the following description.

Super Node (SN): a node that functions as an attendee of a meeting and that serves to forward session data (a media stream, meeting data, etc.) to other attendees (client devices).

Normal node (NN): a node that functions as an attendee of a meeting and that receives session data from a SN.

Data source: a SN in an IP multicast cascading group or subnet group.

Channel: a combination of an IP address and port for instantiating IP multicasting.

Coordinator: a selected node or client device within the network that is responsible for selecting a private IP multicast channel and data source for IP multicasting. The coordinator may also be an attendee.

Server: meeting server or host media server.

Autonomous System (AS): a separately operating network.

Network Address Translator (NAT).

Figure 1:
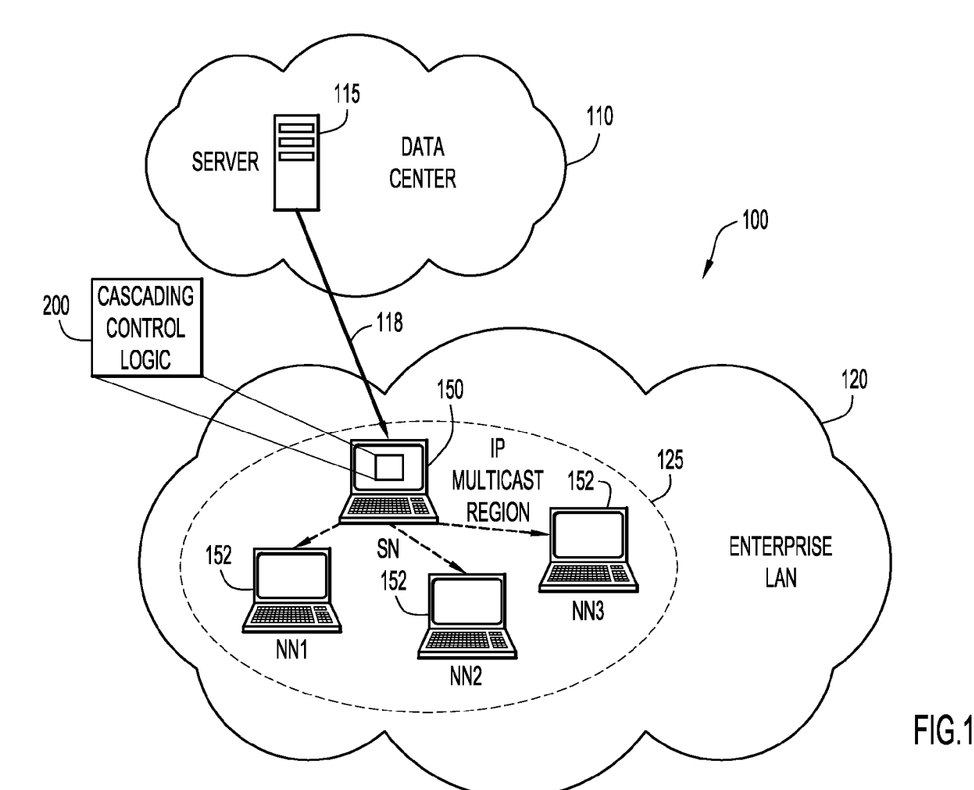
FIG. 1 is a schematic diagram of an example system architecture in which client devices in a network and which include cascading control logic receive a data stream (e.g., meeting data) from a host media server located outside of the network via cascading in an IP multicast region by way of a designated super node.

FIG. 1 is a schematic diagram of an example system architecture in which client devices within a network receive media streams from a host media server located outside of the network via cascading in an IP multicast region via a designated SN. Specifically, system architecture 100 includes a data center 110 including server 115. Architecture 100 further includes network 120, which may be an enterprise LAN, which itself includes an IP multicast region 125. Deployed within IP multicast region 125 may be a plurality of nodes or client devices (e.g., 150, 152) that allow meeting attendees (users) to join a meeting. These client devices may be computers, such as desktop or laptop computers, tablet computers or other mobile devices, connected to network 120 in a wired or wireless fashion. Client devices that are operating as a SN 150 and as NNs 152 are depicted and those client devices comprise cascading control logic 200, the function of which will be explained in more detail below.

Figure 2:
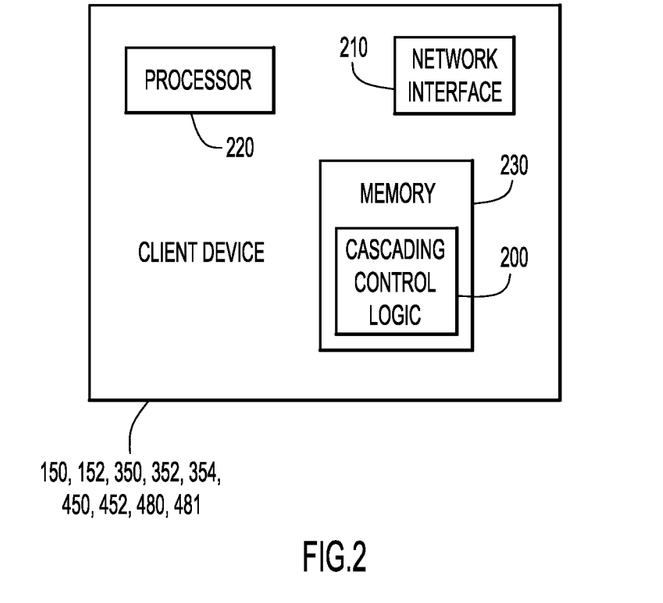
FIG. 2 is a schematic block diagram of an example client device configured to enable the functionality of the cascading control logic.

In an embodiment, a client device (150, 152, 350, 352, 354, 450, 452, 480, 481, as depicted as well in other drawings) may have a general configuration as shown in the block diagram of FIG. 2. In particular, client device (referenced as "152" for convenience) includes a network interface unit 210, a processor 220 and a memory 230. Client device 152 can also include any suitable input and/or output peripheral or other devices (e.g., a keyboard or keypad, an LCD or other suitable display, a mouse or touch pad, a microphone and/or camera/video recorder for audio/video input, a speaker unit or other audio output device, etc.) that facilitate input of data to and output of data from client device 152, where the input and output devices can be separate from or integrated with the computing device.

Network interface unit 210 comprises any suitable interface component (e.g., an Ethernet interface card or switch, a modem, etc.) that facilitates a wireless and/or hardwire connection over a network, e.g., network 120, with other client devices and servers, including SNs, NNs and server 115. It is further noted that network interface unit 210 may be configured for communication and exchange of data with one or more routers or other suitable components within network 120 that facilitate communication with other network nodes as well as facilitate multicasting and unicast functions that may be assigned to client device 152.

Processor 220 may comprise a microprocessor that executes cascading control logic 200 stored within memory 230, where cascading control logic 200 includes operational instructions and software applications.

Memory 230 may comprise read only memory (ROM), random access memory (RAM), magnetic disk storage media devices, optical storage media devices, flash memory devices, electrical, optical, or other physical/tangible memory storage devices, and any combinations thereof. Cascading control logic 200 may further be embodied on any tangible computer readable storage media encoded with appropriate instructions.

Figure 3:
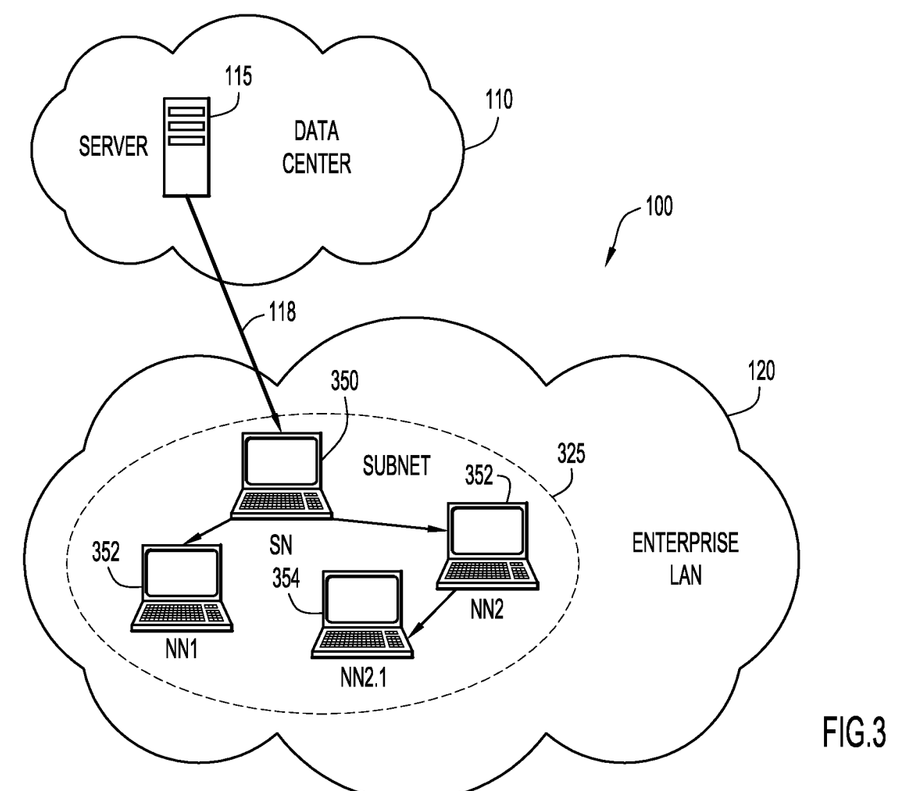
FIG. 3 is a schematic diagram of another example embodiment of a system architecture in which client devices within a network receive a data stream from a host media server outside of the network, where the data streams are supplied via unicast cascading in a subnet.
Figure 4:
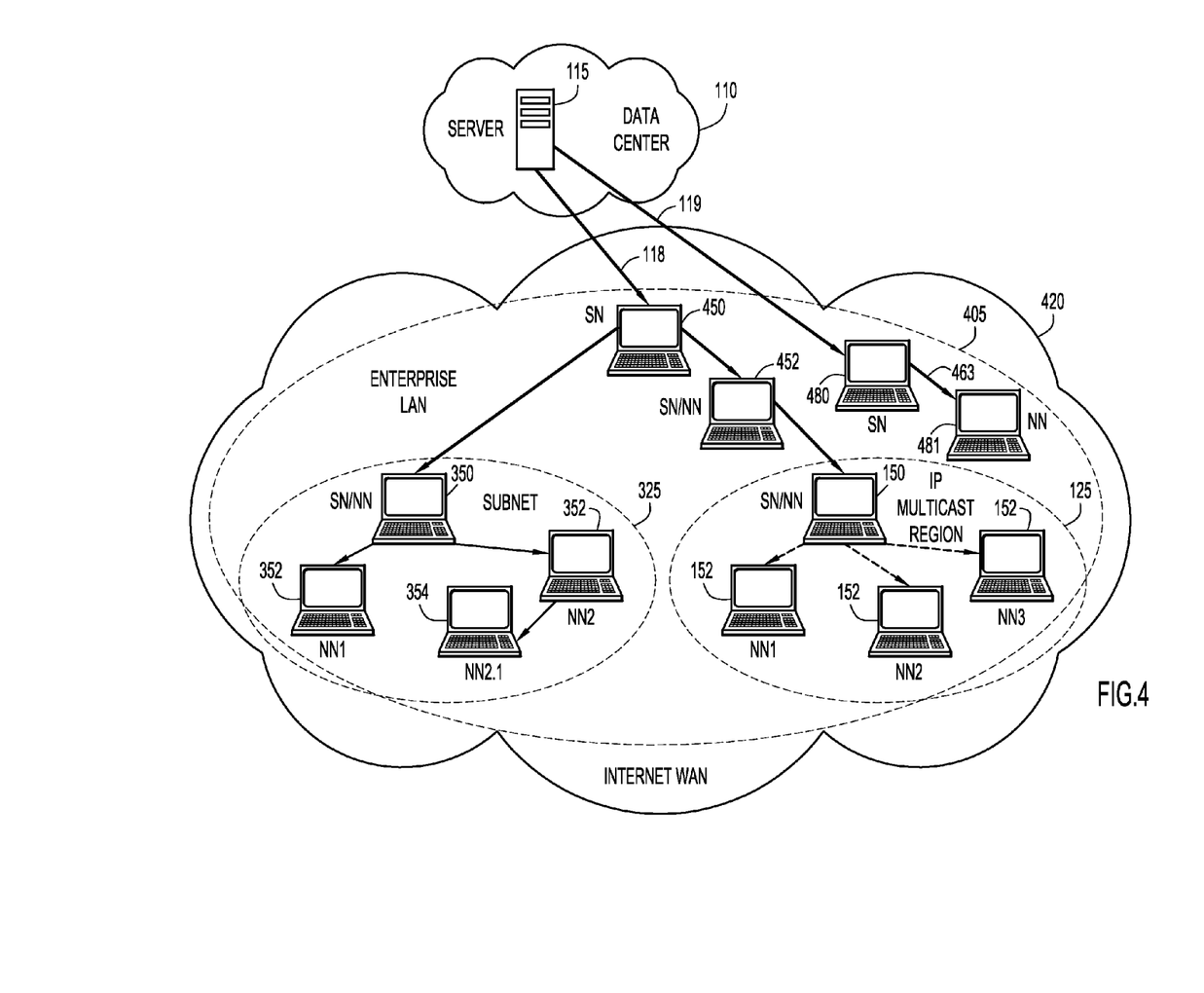
FIG. 4 is a schematic diagram of still another example embodiment of a system architecture in which client devices within a network receive a data stream from a host media server outside of the network, where the data stream is cascaded in a wide area network (WAN).

In accordance with an embodiment, cascading control logic 200 is configured to treat client devices in different network environments differently. That is, cascading control logic 200 is configured to select optimized network connectivity suited for the network environment in which a given client device finds itself. This selection may result in constructing a hybrid, multiple level network among client devices and server 115 to distribute the media stream or session data in order to reduce outbound bandwidth of server 115 and inbound bandwidth of the customer's enterprise LAN 120 without substantially degrading a user's (attendee's) experience. Three different network connectivity or topology approaches are contemplated: IP multicast, which is depicted in FIG. 1, unicast cascading in a subnet as depicted in FIG. 3, and unicast cascading in a WAN as depicted in FIG. 4. The methodologies for selecting which network connectivity approach is to be taken, the joining sequences and a separate stabilization process are next described in turn.

IP Multicast

Where available and enabled, IP multicast is effective in saving outbound bandwidth of a data center and inbound bandwidth of an enterprise LAN as there is only one copy of session data (i.e., a media stream) being transmitted from, e.g., server 115 to multiple client devices 152.

Referring again to FIG. 1, an IP multicast region 125 is depicted in which client device 150 is indicated as a SN and is in communication with server 115, while client devices 152 (NN1, NN2 and NN3) are in communication with SN 150. The dashed lines respectively connecting each NN 152 to SN 150 represent a multicast session from SN 150 to each of the NNs 152. In this configuration, SN 150 transmits only one copy of the media stream to client devices (NNs 152) in the IP multicast region 125.

In accordance with an embodiment, client devices negotiate with each other (using cascading control logic 200) to choose a node as a SN, where the chosen SN then distributes session data (i.e., the media stream) to NNs via an IP multicast session.

More specifically, cascading control logic 200 takes advantage of an a priori known IP multicast channel (such as one designated for the WebEx® meeting service), which is used for negotiating private IP multicast channels for a specific meeting instance. For one meeting instance, there can be several private IP multicast channels for data multicasting of different sessions. Each meeting instance uses the a priori known IP multicast channel to elect its own private IP multicast channels in order not to conflict with other meetings.

When a cascading session begins according to one embodiment, server 115 designates, e.g., a first client device that joins the meeting or the session as a "coordinator" and notifies that client device as such. The coordinator's function is to select an unused private IP multicast channel for the given session and also to select a meeting attendee (client device) of which it is aware that can be designated as a data source, i.e., a SN for an IP multicast transmission for the session.

To select an unused private IP multicast channel, the coordinator sends a request over the a priori known IP multicast channel to collect information about private channels currently used by other sessions. Other coordinators are responsible for responding to this request. Using the responses received, the coordinator can choose an unused private channel and then joins that unused private channel.

To confirm that the private channel is in fact unused, the coordinator may query in the private channel and listen for a period of time (e.g., several seconds) to determine whether any responses are received. If any responses are received, then it is determined that there is a conflict with another meeting or application. If a conflict is so detected, then another private channel is selected until an unused private channel can be confirmed.

Other meeting attendees (client devices) that join the session after the coordinator likewise join the a priori known channel to announce their existence in the session, and then listen on that channel for the coordinator to announce/identify the private channel and data source (i.e., the SN that will be responsible for transmitting the IP multicast session).

If the private channel and data source have already been elected by the time a new attendee joins the session, the coordinator will respond to the new attendee with this information (using the a priori known channel). Otherwise, this information will be announced when the selection process is finished and a newly joining attendee will wait for the information.

After a predetermined time from when the private channel of the session is selected, and if there is at least one other attendee known by the coordinator in the session, the coordinator starts a selection process for the data source. In one embodiment, the data source (the client device that will act as the SN 150) is selected by the coordinator according to, e.g., the respective general performance (CPU, memory, bandwidth, etc.) of the attendee client devices. When the data source (SN) is selected, the coordinator will announce this information and the private channel to be used to other attendees (via the a priori known channel). The client device selected as the data source (SN) may then register with server 115. This registration with and subsequent data transmission from server 115 is depicted in FIG. 1 by connection 118.

It is possible that either the coordinator or other attendees might not receive a response over the a priori known channel when attempting to join the IP multicast session. One of several reasons may account for such a non-response, including the possibility that IP multicast is disabled in the network (often the case in an enterprise network implementation), there is no other attendee at that time besides the current sender, or the request or response is lost in the network. In accordance with one possible implementation, should IP multicast join for a client device (attendee) fail, regardless of the reason, the client device can next attempt to join the meeting via cascading in its subnet, as described below.

Cascading in Subnet

As noted, it is not uncommon for IP multicast to be disabled in a LAN or, alternatively, only to be enabled in selected subnets of a LAN. On the other hand, unicast transmission is almost always enabled in a subnet if internet access is available.

In a subnet, the round-trip time (RTT) between two given nodes is extremely small, and upload bandwidth is limited, effectively, only by the throughput of, e.g., network interface 210 of a given client device. As a result, in a subnet, a designated SN can act as a source of session data for multiple NNs and, moreover, a hierarchy of levels can be established to pass the session data from one client device to another.

More specifically, FIG. 3 shows a schematic diagram of a network architecture in which client devices 352 within a subnet 325 receive session data from server 115 (which is outside of the subnet), where the session data is supplied via unicast cascading from SN 350 (in subnet 325). SN 350 itself receives the session data via connection 118.

Thus, in accordance with an embodiment, when IP multicast fails for a given meeting attendee, cascading control logic 200 on the associated client device is configured to next attempt to join the session or meeting via a unicast transmission from a designated client device.

The operations for joining subnet cascading are as follows. When an attendee fails to join an IP multicast group, it broadcasts to find whether there is a SN from which it may be able to obtain session data in a unicast fashion. If a SN (e.g., SN 350) receives this request, cascading control logic 200 operating therein is configured to determine whether SN 350 has sufficient capacity (e.g., output bandwidth) to support a unicast transmission to the requesting meeting attendee (e.g., NN1 (352)) in subnet 325. If SN 350 has sufficient capacity, SN 350 sends a response to the newly-joining attendee (NN1 352) using a unicast transmission and initiates the unicast transmission.

If the newly-joining attendee receives responses from multiple SNs (not shown), the newly-joining attendee, e.g., NN1 (352) can choose a "best" available one as its unicast source. The best candidate can be selected by considering CPU, memory and bandwidth characteristics of each candidate SN along with RTT from each SN to the NN under consideration. Using an appropriate algorithm to assign numeric values to the foregoing factors, it is possible to rate each candidate SN, and then select, e.g., the SN having a highest rating.

It is noted that it is possible that the meeting attendee fails to receive a response from any SN. Reasons for such failure can include the possibility that there is no currently-present SN, there is no SN with sufficient capacity to supply the desired unicast transmission, or the request from the joining meeting attendee was lost in the network. When such a failure does occur, cascading control logic 200 in the client device is configured to wait a predetermined amount of time and then announce itself as a SN in subnet 325. As a result, the client device will then be able to serve other meeting attendees (client devices) seeking to join the session via unicast transmission.

Thus, still referring to FIG. 3, a given one of the client devices declares itself as SN 350, registers itself as such with server 115 via connection 118, and then makes itself available to other client devices to send unicast transmissions of the session data. In the self-arranging topology (coordinated by cascading control logic 200) shown in FIG. 3, SN 350 serves NN1 and NN2. At the same time, NN2 serves as a unicast source to NN 2.1 (client device 354).

Cascading in WAN

It is of course possible that some client devices are neither in an IP multicast region or in a subnet with a SN capable of supporting a unicast transmission, or that selected clients simply fail to connect to a SN to obtain the data via IP multicast or unicast. FIG. 4 illustrates a possible system architecture in which client devices within a network receive a media stream from server 115, where the data stream is cascaded in a wide area network (WAN) 420. As shown, IP multicast region 125 is arranged in an enterprise LAN 405 including SN/NN 150 and NNs 152 connected via respective dashed lines. SN/NN 150 is served by SN/NN 452 via unicast connection 460 and SN/NN 452 is served by SN 450 via unicast connection 461.

Meanwhile cascading in subnet 325 within enterprise LAN 405 is constructed with SN/NN 350 receiving a unicast transmission from SN 450 via connection 462. In turn, SN/NN 350 delivers unicast transmissions to NNs 352, and NN2 352 delivers a unicast transmission to NN 2.1 354.

However, client devices 480, 481 may have been unable to join either in IP multicast region 405 or in subnet 325. Consequently, cascading control logic 200 is configured to enable such client devices to nevertheless attend a meeting and receive the data stream using cascading in WAN 420. (And, as will be explained further below in connection with stabilization operations, client devices can always fall back to cascading in WAN 420 if and when IP multicast or unicast cascading in the subnet fail.

Thus, as shown, client device 480 may register itself with server 115, and possibly being the only client device registering in WAN in this fashion, declares itself to be a SN with a connection 119 to server 115. Then, when client device 481 attempts to register with server 115 and query for a candidate SN, server 115 can notify client device 481 that client device 480 is functioning as a SN. As such, cascading control logic 200 is configured to set up a unicast connection from client device/SN 480 to client device/NN 481.

Figure 5:
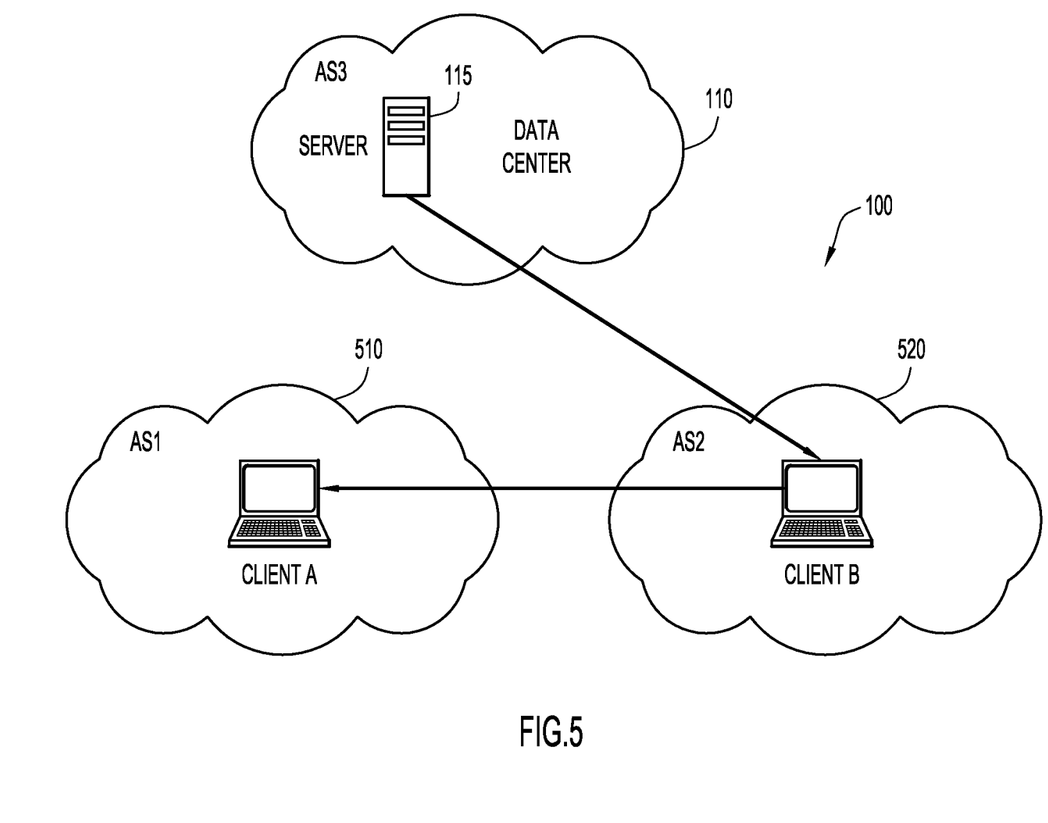
FIG. 5 is a schematic diagram illustrating how it may be possible for a given client device in a WAN to obtain a better user experience by receiving a data stream via a cascaded architecture rather than directly from the host media server.

It is noted that in some cases, a client device might deliver a better user experience by obtaining session data from a SN functioning as a relay than by obtaining session data directly from server 115. Reference is made to FIG. 5 to explain this scenario. Assume client device A is in AS1 (autonomous system) 510, another client device B is in AS2 520, and server 115 is in AS3 110. The round trip time (RTT) between AS1 510 and AS3 110 is RTT (1-3), the RTT between AS2 520 and AS3 110 is RTT (2-3), and the RTT between AS1 510 and AS2 520 is RTT (1-2). If RTT (1-3)>RTT (2-3)+RTT (1-2), then client device A might have a better user experience if client device A obtains session data from client device B rather than directly from server 115.

Those skilled in the art will appreciate that appropriate peer-to-peer applications may be needed to establish cascading connections between client devices located in autonomous systems in a WAN in that, e.g., some client devices may be located behind firewalls or NAT devices.

In accordance with an embodiment, cascading in the WAN may be performed as follows. Meeting attendees that join a meeting by cascading in a WAN may first query for/obtain information including location, AS information, NAT address, etc. and, as appropriate, hash that information into an obscured format, and then register to server 115 with this information.

Although this information is hashed, it may nevertheless represent some characteristics of an attendee trying to join a meeting. For example, attendees with the same hashed location information string are likely to have small RTT with each other. Also, attendees with the same hashed NAT address are likely to be in a same network environment. Further, using the hashed AS information, server 115 can discover a better routing path for an attendee with RTT information it maintains among ASs. For example, in one possible embodiment, server 115 maintains a database of RTTs among known ASs, such that when a meeting client provides its AS information to server 115 (and supposing it is AS_1), server 115 can check all known SN candidates for this meeting client to find one (and supposing it is in AS_2) that have a smallest RTT from the meeting client via the SN to server (suppose server is in AS_3). That is to say, (RTT from AS_1 to AS_2)+(RTT from AS_2 to AS_3) is the smallest one among all possible choices.

With the information received at server 115, attendees can be grouped and candidate SNs can be identified for the meeting attendee attempting join cascading in WAN 420 or attempting to find a SN in WAN 420.

In one implementation, an attendee records SNs that have failed to respond in order to avoid subsequent (perhaps futile) connection attempts. In another possible implementation a meeting attendee can request that server 115 supply it random candidates for SNs with which to make connection attempts.

Loop Detection

Because a self-arranged cascading network as described herein can potentially result in multiple levels communicating with one another, it is important to avoid looping circuits, wherein a SN might receive data from its child node when the child node is receiving data from it. Thus, when an attendee identifies and connects with a SN, cascading control logic 200 is configured to perform a looping circuit check before receiving data from that SN. In one possible approach to loop checking, the client device sends a data packet to server 115 via the path of its SN. If the client device receives a response from server 115, then it may be assumed that there is no looping circuit in this path. On the other hand, if the client device receives the same data packet from one of its NNs, then it can be assumed that a loop exists in the path, and the client device should accordingly abandon that SN. Loop circuit detection can be particularly important when a given client device is operating as a SN and finds a new SN for itself.

Stabilization Operations

The methodology and functionality described herein that enables a client device/meeting attendee to find a SN or join a cascading construct using one of several different approaches in a sequential fashion, also includes stabilizing operations that are performed periodically after a client device initially and successfully receives the data stream but one of those avenues.

In stabilizing operations, a meeting attendee may announce its existence and query whether there are other attendees in the same session in the a priori known channel reserved for IP multicast. That is, periodically, a meeting attendee can inquire as to whether an IP multicast session can be joined. So, as an example, where a given client device has joined a meeting via unicast in the subnet, cascading control logic 200 may be configured to cause the client device to "investigate," on a periodic basis, whether an IP multicast session is available via which the session data can be obtained. If such an IP multicast session is available (as evidenced by, e.g., the client device receiving notification of a private IP multicast channel via the a priori known channel), the client device can leave the SN to which it is connected in the subnet and switch to the private channel for the IP multicast (noting that the private channel may be supported by the same SN that is a data source in the subnet for other attendees). A client device connected via cascading in the WAN can perform a similar stabilization operation.

Cascading control logic 200 may further provide a failover mechanism for IP multicast failure. Specifically, when the IP multicast data source becomes unavailable, each meeting attendee connected to that data source automatically registers directly with server 115 for session data in an effort to maintain continuity of the meeting. Then, if the coordinator is alive, the coordinator is configured to choose another data source and notify other attendees in the private channel. If the coordinator is not alive, server 115 can detect that and elect a new coordinator. The new coordinator then selects a new data source and notifies other attendees to switch back to the private channel. In this way, an IP multicast session can resume in a relatively quick fashion.

Stabilization operations may also be performed in connection with unicast in a subnet. In a subnet, SNs that receive data from server 115 may periodically also try to find their own, intervening, SN (see, e.g., FIG. 4 and "intervening" client device 450 that supplies data to SN/NN 350). This self-arranging of client devices is helpful to reduce the total number of SNs and improve the structure of the constructed cascading network.

In the instant cascading framework, the SN of the IP multicast group, and those top SNs in subnet will register with server 115 as such and server 115 may maintain a list of those nodes in connection with constructing SN-NN relationship within WAN 420. That is, as noted, when a client device searches for a SN in WAN, server 115 responds it with candidate nodes. It is noted that the several cascading approaches described herein operate in different layers. Specifically, cascading operations in a WAN operate at Layer 3, cascading operations in a subnet operate in Layer 2, and cascading operations for IP multicast operate in Layer 1, the respective operations can run their own stabilizing functions, and run them simultaneously. One a node finds a SN in lower layer, for example, a NN in the WAN finds an appropriate SN in its subnet, it will leave the previous SN in the WAN and use the new SN in the subnet to obtain the data stream.

Once a meeting attendee that has joined via cascading in the WAN finds a SN in a subnet, it will leave the SN in the WAN and switch to the SN in the subnet. It is noted, however, that the same SN could be still a SN in WAN for other meeting attendees.

As with the failover operation for IP multicast sessions, the failover operation for a failure in cascading in a subnet is to automatically switch a meeting attendee to server 115 for session data, and then to attempt to find a new SN in the subnet via which to receive a unicast transmission.

Operation of Cascading Control Logic

In sum, cascading control logic 200 provides significant functionality to client devices that are used to join, e.g., a video or web conference via the internet. Cascading control logic 200 enables a cascading hybrid network, having, potentially, multiple levels, wherein the network is self-adaptive among meeting attendees. At a high level, cascading control logic supports three main kinds of network environments for meeting data connectivity: IP multicast, subnet, and other common network topology, e.g., a WAN. Cascading control logic 200 is configured to select a SN (or case the client device to designate itself as a SN) within these different network environments sequentially, as joining attempts fail. In one embodiment, a sequence might be to first attempt to join an IP multicast session, then, if the IP multicast join operation fails, attempt to join a unicast transmission in the same subnet, and then in the event both of those network environments did not result in a successful join operation, cascading control logic is configured to request from server 115 candidate SNs that can be used as a source of the data stream in the WAN.

Figure 6:
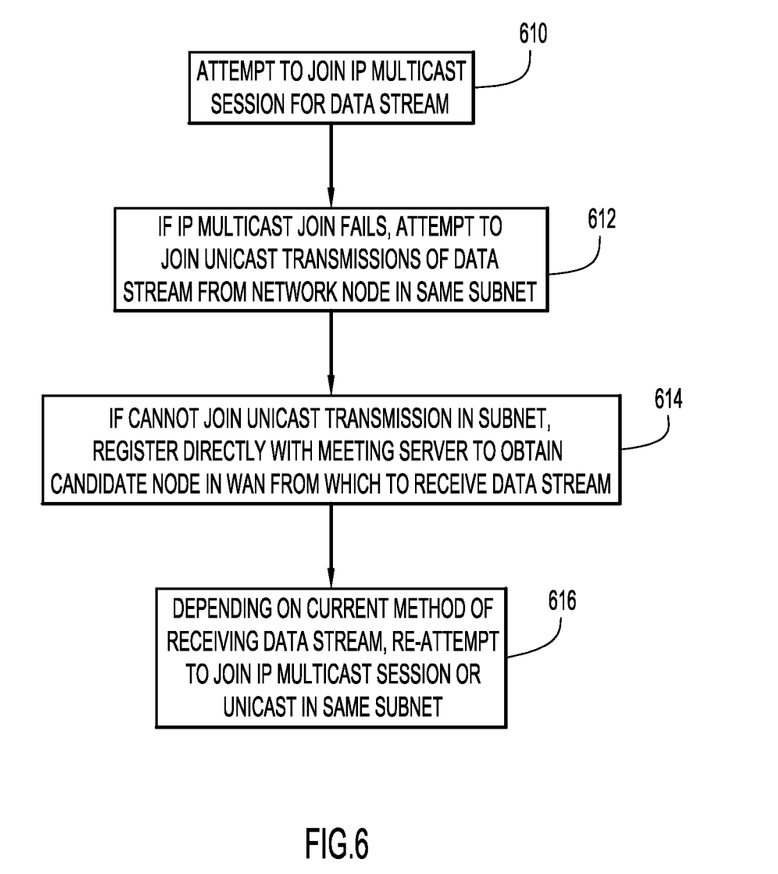
FIG. 6 is a flow chart depicting example operations of the cascading control logic that is operating in connection with respective client devices.

FIG. 6 is a flow chart depicting example operations of cascading control logic 200 that is operating within respective client devices in a network. At 610, an attempt is made to join an IP multicast session for a selected data stream or meeting. At 612, if the join operation for the IP multicast session fails, an attempt is made to join a unicast transmission of the data stream from a network node in the same subnet. At 614, if the client device cannot join the unicast transmission in the subnet, the client device can register directly with the meeting server to obtain one or more candidate SNs in the WAN from which to receive the data stream. At 616, depending on a current method of reception of the data stream, there may be a re-attempt to join an IP multicast session or a unicast transmission in the same subnet. This last operation may be considered a stabilization operation as discussed above. And, as noted, for each kind of network environment, a different stabilizing operation may be run. For example, for IP multicast, stabilization may comprise finding the private channel and data source for the IP multicast session, for unicast in the subnet, stabilization may comprise finding a SN in the subnet, and for the WAN, stabilization may comprise finding a better SN in the WAN.

When a SN via which a client device is receiving the data stream becomes unavailable, cascading control logic 200 is configured to switch to a source server (i.e., the meeting server) and request data directly from that server.

In the cascading approach described herein, a SN may be chosen by taking into account its resources including CPU power, memory, bandwidth, etc., and the SN's load is controlled to ensure that the user experience via the SN is not appreciably worse than it would be by obtaining the data stream directly from the meeting server. In this regard, the SN may monitor its performance data (CPU, memory, bandwidth, etc.) periodically to see whether it is under heavy load, and will eject or drop selected NNs or refuse new request from other attendees seeking to join the meeting. Further, in one possible implementation, a NN may compare the RTT between it and its SN with a configured threshold value of each session to determine whether it is reasonable to continue to receive the data steam via the SN instead of the meeting server. If the NN finds that the SN path is not sufficient, the NN can initiate its own failover to the meeting server thereby dropping off from the SN. The NN may thereafter seek a new SN during its subsequent stabilization operations.

Finally it is noted that if the inbound bandwidth of an enterprise LAN is not sufficient to deliver smooth meeting services and there are too many attendees inside the LAN, each meeting attendee's user experience will suffer. However, with the cascading techniques described herein, a SN can receive data from a server more quickly because available bandwidth is often at least sufficient to support several SNs, which can then, in turn, distribute the data stream to their respective NNs.

Also, when a data source is the "real" source of the data stream (i.e., a meeting attendee sharing their desktop or supplying a video stream from their camera) and is in a same LAN with other attendees, the real source can also operate as a SN and send data directly to its NNs, and in this case the user experience at those NNs may be improved greatly.

The above description is intended by way of example only.

What is claimed is:

1. A method comprising:
    attempting, by a first client device, to join an Internet Protocol (IP) multicast session in a network in which the first client device is operating and, if successful joining the IP multicast session for a selected data stream that originates from a meeting server;
    if the first client device fails to join the IP multicast session in the network in which the first client device is operating, attempting, by the first client device, to join a unicast transmission of the data stream from a network node other than the meeting server and that is in a same subnet as the first client device; and
    if the first client fails to join the unicast transmission within the same subnet, registering the first client device with the meeting server to obtain a candidate node in a wide area network in which the first client device is located from which to receive the data stream.

2. The method of claim 1, further comprising designating, by the first client device, a second client device as a super node via which the data stream is supplied to the first client device using an IP multicast session.

3. The method of claim 1, further comprising when a failure of the IP multicast session is detected, at the first client device, after the first client device has joined the IP multicast session, registering the first client device with the meeting server to receive a unicast transmission directly from the meeting server.

4. The method of claim 1, further comprising receiving, at the first client device, a notification, from a second client device, that identifies private channel information via which the first client device can join the IP multicast session.

5. The method of claim 1, further comprising designating, by the first client device, a second client device, within the same subnet as the first client device, as a super node via which the data stream is supplied to the first client device using a unicast transmission.

6. The method of claim 5, further comprising determining, by the first client device, whether the second client device has sufficient resources to support the unicast transmission.

7. The method of claim 5, further comprising, from the first client device, supplying a unicast transmission of the data stream to at least a third client device.

8. The method of claim 1, further comprising when a failure to receive the data stream via a unicast transmission from a network node other than the meeting server and that is in a same subnet as the first client device is detected at the first client device after so receiving the data stream, registering the first client device with the meeting server to receive a unicast transmission directly from the meeting server.

9. The method of claim 1, wherein registering the first client device with the meeting server comprises supplying, from the first client device to the meeting server, a location of the first client device and autonomous system information associated with the location of the first client device.

10. The method of claim 9, further comprising periodically attempting, at the first client device, to join the IP multicast session after the first client device is already receiving the data stream via a unicast transmission.

11. An apparatus comprising:
a processor,
a memory, and
a network interface unit,
wherein the memory stores instructions executable by the processor to:
attempt to join an Internet Protocol (IP) multicast session in a network in which the apparatus is operating and, if successful to join the IP multicast session for a selected data stream that originates from a meeting server;
if there is a failure to join the IP multicast session, attempt to join a unicast transmission of the data stream from a network node other than the meeting server and that is in a same subnet as the apparatus; and
if there is a failure to join the unicast transmission within the same subnet, register with the meeting server to obtain a candidate node in a wide area network in which the apparatus is located from which to receive, via the network interface, the data stream.

12. The apparatus of claim 11, wherein the instructions are further executable by the processor to:
designate another like-apparatus as a super node via which the data stream is supplied using an IP multicast session.

13. The apparatus of the 11, wherein the instructions are further executable by the processor to:
when a failure of the IP multicast session is detected to register with the meeting server to receive a unicast transmission directly from the meeting server.

14. The apparatus of claim 11, wherein the instructions are further executable further by the processor to:
receive a notification that identifies private channel information via which to join the IP multicast session.

15. The apparatus of claim 11, wherein the instructions are further executable further by the processor to:
designate another like apparatus, within the same subnet, as a super node via which the data stream is supplied using a unicast transmission.

16. One or more computer readable storage media encoded with software comprising computer executable instructions and when the software is executed operable to:
attempting, by an apparatus to join an Internet Protocol (IP) multicast session in a network in which the apparatus is operating and, if successful to join the IP multicast session for a selected data stream that originates from a meeting server;
if there is a failure to join the IP multicast session, attempt to join a unicast transmission of the data stream from a network node other than the meeting server and that is in a same subnet; and
if there is a failure to join the unicast transmission within the same subnet, register with the meeting server to obtain a candidate node in a wide area network from which to receive the data stream.

17. The computer readable storage media of claim 16, further comprising instructions operable to:
designate a node as a super node via which the data stream is supplied using an IP multicast session.

18. The computer readable storage media of claim 16, further comprising instructions operable to:
when a failure of the IP multicast session is detected to register with the meeting server to receive a unicast transmission directly from the meeting server.

19. The computer readable storage media of claim 16, further comprising instructions operable to:
receive a notification that identifies private channel information via which to join the IP multicast session.

20. The computer readable storage media of claim 16, further comprising instructions operable to:
designate another node, within the same subnet, as a super node via which the data stream is supplied using a unicast transmission.

* * * * *